United States Patent
Klinkenberg et al

[11] 4,039,538
[45] Aug. 2, 1977

[54] PREPARATION OF TRIS-(HALOPHENOXY)-SYM.-TRIAZINES

[75] Inventors: Herbert Klinkenberg, Troisdorf; Egon Petersen, Neukirchen; Werner Schmidt, St. Augustin, all of Germany

[73] Assignee: Dynamit Nobel Aktiengesellschaft, Cologne, Germany

[21] Appl. No.: 523,282

[22] Filed: Nov. 13, 1974

[30] Foreign Application Priority Data
Nov. 14, 1973  Germany .............................. 2356730
Nov. 14, 1973  Germany .............................. 2356771

[51] Int. Cl.² .......................................... C07D 251/34
[52] U.S. Cl. ......................... 544/219; 260/45.8 NT; 106/15 FP
[58] Field of Search ................... 260/248 CS

[56] References Cited
U.S. PATENT DOCUMENTS
3,245,992  4/1966  Dexter et al. ......................... 260/248
3,843,650  10/1974  Pews et al. ............................ 260/248

OTHER PUBLICATIONS
Schuldt et al., Contribs. Boyce Thompson Inst., vol. 18, pp. 377-393, (1956).

Primary Examiner—John M. Ford
Attorney, Agent, or Firm—Burgess, Dinklage & Sprung

[57] ABSTRACT

Process for the preparation of tris-(halophenoxy) -1,3,5-triazine of formula I

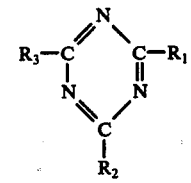

wherein $R_1$, $R_2$, and $R_3$ is each a phenoxy substituent having a 0-2 alkyl groups, and 0-2 halo alkyl groups, and has 1-5 halogen atoms which comprises contacting cyanuric acid chloride with alkali phenolate of the formulae $R_1Me$, $R_2Me$ and $R_3Me$, wherein Me is alkali metal, and wherein said formulae can be identical or different, in the presence of alkylene diol monoalkyl ether, e.g. methyl or ethyl cellosolve. The ethers are good solvents for the phenolates. The products are used as flame-proofing agents for plastics.

11 Claims, No Drawings

PREPARATION OF TRIS-(HALOPHENOXY)-SYM.-TRIAZINES

BACKGROUND

The subject matter of the following invention is a simple method of manufacturing tris-(halophenoxy)-sym.-triazines and new tris-(halophenoxy)-sym.-triazines.

Tris-(halophenoxy)-s-triazines have already been prepared individually, but hitherto there has been no economical process making it possible to obtain these substances in high yields with a short reaction time and a simple method of procedure. For example, according to French Pat. No. 1,566,675, tris-(2,4,6-tribromophenoxy)-s-triazine is obtained from cyanuric acid chloride and 2,4,6-tribromophenol in a yield of only 67% by a reaction taking several hours. This process, therefore, cannot be considered as being at all satisfactory.

There has therefore been a need to develop a process that will not have these disadvantages.

THE INVENTION

It has been found that equimolecular amounts of the particular phenolate involved, dissolved in alkylenediolmonoalkyl ethers, can be made to react smoothly and rapidly with cyanuric acid chlorides to produce high yields, the said phenolates being formed preferably in the solvent for the sake of simplicity.

The subject matter of the invention is a process for the preparation of tris-(halophenoxy)-1,3,5-triazines of the formula

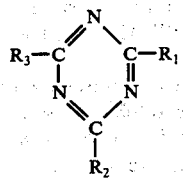

I in which $R_1$, $R_2$ and $R_3$ are identical or different phenoxy substituents, halogenated in the nucleus with 1 to 5 halogen atoms, through the reaction of cyanuric acid chloride with once to five-times halogen-substituted alkali phenolates at elevated temperature, which is characterized in that previously formed once to five-times halogen-substituted alkali phenolates or the corresponding phenols are made to react at temperatures of 60° to 180° C together with alkali hydroxides in a thrice molar amount with respect to cyanuric acid chloride, in the presence of alkylenediolmonoalkyl ethers as solvents.

The groups $R_1$, $R_2$ and $R_3$, referred to hereinafter as "halophenoxy substituents" for the sake of brevity, are bonded to the carbon atoms of the symmetrical triazine ring by the oxygen of the phenoxy group. The term "phenoxy substituents halogenated 1 to 5 times in the nucleus", as used in this specification, refers to phenoxy substituents containing halogen atoms wholly or partially in the nucleus as well as to mono- and dialkyl, mono- and dihalogenalkyl, and preferably monomethyl and monohalogenmethyl phenoxy substituents, only up to 3 or only up to 4 halogen atoms, respectively, being present in the case of the additional alkyl groups, and the carbon atoms of the phenol ring which do not bear the oxy oxygen, halogen atoms or alkyl groups bear hydrogen substituents. The term "halogen atoms" refers preferentially to chlorine or bromine atoms, and in some cases fluorine atoms, a variety of halogen atoms being able to be present in the same molecule as well as in the same halophenoxy substituent. In the case of mono- and dihalogenalkyl groups, the latter are completely or partially halogenated, preferably with bromine or chlorine. Of these groups the tribromomethyl and trichloromethyl group are preferred. The alkyl group, if present, having preferably 1-4 carbon atoms.

The starting substances are the halophenolates or halophenols corresponding to the halophenoxy substituents, especially pentachlorophenolates and pentabromophenolates, or mixed penta-(chloro, bromo)-phenolates, the isomeric tetrachloro- and tetrabromophenolates, dichloro- and dibromophenolates and monochloro- and monobromophenolates, their mixed (chloro, bromo)-phenolates, isomer mixtures of these substances, the corresponding fluorophenolates and the phenols corresponding to the foregoing.

It is possible to use both solid and dissolved, previously formed halophenolates, and to form the halophenolates in the solution prior to the reaction, with the addition of the approximately equivalent amount of alkali hydroxide. The cyanuric acid chloride can be used in the form of the solid substance or in the form of a solution in alkylenediol monoether.

The amount of the halophenolates or halophenols, as the case may be, corresponds to the amounts necessary for the formation of the tris compounds--generally, therefore, 3 moles of phenolate or phenol per mole of cyanuric acid chloride, a slight excess of about 5 to 10%, preferably of the phenolate or phenol, being possible and desirable.

The phenolates of sodium and potassium are preferred as the alkali phenolates, and the hydroxides of sodium and potassium are preferred as the hydroxides.

Alkylenediol monoalkyl ethers, called glycol monoethers for brevity, can be used as solvents and reaction media in the practice of the method of the present invention, preferably those having 2 to 4 carbon atoms in the alkylene group and 1 to 4 carbon atoms in the alkyl group, examples being 1,4-butanediolmonomethylether, 1,4-butanediolmonoethylether, 2,3-butyleneglycolmonomethylether, 2,3-butyleneglycolmonoethylether, propyleneglycolmonomethylether, propyleneglycolmonoethylether, ethyleneglycolmonobutylether, ethyleneglycolmonoethylether, ethyleneglycolmonomethylether. The last two are greatly preferred for the process of the invention, being often called methyl or ethyl cellosolve.

Glycolmonoalkyl ethers have proven desirable for the process of the invention because they easily dissolve most phenolates in sufficient quantity and thus permit a uniform method of procedure with regard to the phenolate. Furthermore, the half-ethers used have the advantage of boiling points above 100° C, which permits operation at normal pressure, since a smooth reaction starts only at temperatures around 100° C. If the reaction is performed in tetrahydrofuran, for example, which is also a good solvent for pentachlorophenol sodium, for example, operating at the refluxing temperature, it is virtually impossible to obtain the desired products.

Also surprising was the finding that the phenolic hydroxyl reacts quite preferentially with the cyanuric acid chloride, while the hydroxyl of the glycolmonoalkyl ether gives rise to virtually no secondary reactions.

Furthermore, the glycol ethers are easily available solvents.

It is desirable to perform the process of the invention by first placing the monoalkyl glycol in the reaction vessel, then adding the alkali hydroxide to the monoglycol ether, and heating this mixture with stirring at 60° to 80° C, the alkali hydroxide dissolving rapidly. Then the halophenol is gradually stirred in at this temperature, whereupon a solution of the phenolate is immediately obtained. Then, starting at about 70° C, the cyanuric acid chloride, in solid form or dissolved, is poured into the phenolate solution, with stirring, such that the temperature does not rise to more than 85° to 90° C. The addition of the cyanuric acid chloride can be completed within a few minutes, whereupon the reaction mixture is immediately heated to the refluxing temperature (approximately 110° C in the reaction mixture if methyl cellosolve is used). To complete the reaction the mixture is boiled for an additional 30 minutes to one hour.

The tris-(halophenoxy)-sym.-triazines formed precipitate in most cases while the mixture is still hot. Depending on their solubility, they are either directly filtered out after cooling of the reaction mixture, or they are isolated by stirring the reaction mixture into water.

Largely pure products are immediately obtained, which after drying can be used for most purposes without further refinement.

We have found the temperature range for the reaction of the process of the invention to be from 60° to 180° C, more desirably 70° to 160° C, and preferably 80° to 150° C.

Additional subject matter of the invention are the new substances, tris-(2,3,4,5,6-pentabromophenoxy)-sym.-triazine, tris-(2,3,4,6-tetrachlorophenoxy)-sym.-triazine, tris-(2,4,6-trichlorophenoxy)-sym.-triazine, tris-(2,4-dichloro-6-methylphenoxy)-sym.-triazine and tris-(2,4-dichlorophenoxy)-sym.-triazine.

The tris-(halophenoxy)-sym.-triazines can be used as intermediate products for a number of syntheses. They are valuable for use as flameproofing agents in the preparation of flame resistant plastics.

Further subject matter of the invention is therefore a method of preparing flame resistant plastics, which is characterized by the use of tris-(halophenoxy)-1,3,5-triazines of Formula I as the flameproofing agents, in amounts of 5 to 25%, preferably 10 to 15%, by weight, with respect to the polymers in the plastic.

There has been no lack of attempts to render plastics more resistant to flame and combustion by adding suitable agents to them. In addition to inorganic compounds, such as borates and aluminum hydrates, largely organic sulfur, phosphorus and halogen compounds have been used for this purpose. Many of these compounds are difficult to manufacture, expensive, and of such poor effectiveness that considerable amounts of them must be added to the thermoplastics in order to achieve a satisfactory effect. It has often been found disadvantageous in these compounds that their thermal stability is too poor or their volatility is too high, resulting in decomposition during the fabrication of the plastics, or in a hazard to health due to the formation of vapors.

Particularly valuable as flameproofing agents are pentabromophenoxy, pentachlorophenoxy, mixed penta-(bromo, chloro)-phenoxy, isomeric tetrabromo- and tetrachlorophenoxy, dibromo- and dichlorophenoxy and tetrabromo- and tetrachlorophenoxy triazines, mixed tri- to tetra-(bromo, chloro)phenoxytriazines, and mixtures of these substances.

Preferred are those having 2 to 5 bromine atoms, and of these those having more than 3 bromine atoms, plus those having 3 to 5 chlorine atoms in the phenoxy substituent.

Quite especially preferred are pentabromo-, tetrabromo-, penta-(bromo, chloro)-phenoxy, and pentachlorophenoxy triazines.

Surprisingly, such compounds are thermally very stable, easily miscible with the most important thermoplastics, and in addition they have a strong flame inhibiting effect.

It is known in the chemical flameproofing art that flame inhibiting effects can be further improved by adding certain suitable substances; these substances include $Sb_2O_3$. For example, if only 10% of a tris-pentabromophenoxy-sym.-triazine together with 4% of an antimony compound such as $Sb_2O_3$ is added to a polyester, such as polybutyleneterephthalate, for example, the mixture is already outstandingly flame-resistant and attains the best score, SE O, in the UL 94 Test.

Instead of antimony compounds the mixture may also contain additions of boron compounds, such as borax or boro trioxide.

Good results comparable to those of the pentabromophenoxy compounds are also produced by the tetra- and tribromophenoxy compound, while the chlorophenoxy compounds must be added generally in greater quantity in comparison with the corresponding bromine compounds.

Remarkably, the triazine compounds develop no appreciable amounts of vapor, even at the fabrication temperatures around 250° C which are required for polyesters.

It is furthermore surprising and by no means obvious in the chemistry of fire inhibiting substances that the compounds of the invention have a considerable range of applications. For example, the flameproofing agents added in accordance with the invention have a strong flame-inhibiting action in polyesters, i.e., condensation products of diols and dicarboxylic acids, such as polyethylene or polybutylene terephthalates, polyamides, low-pressure and high-pressure polyethylenes, their mixtures with chlorinated polyethylenes or ethylene-vinyl ester copolymers, polypropylene, polystyrene, ternary copolymers or graft polymers such as those of acrylonitrile, butadiene and styrene (ABS) or methacrylic acid, butadiene and styrene (MBS) and other thermoplastics, and also in thermosetting plastics. Thus, plastics can be made which are slow-burning or even self-extinguishing, depending on the proportions.

For the testing of the flameproofing action, a test originated by our own research was used, which makes it possible to judge the combustion behavior of suspended specimens of plastic under defined conditions. On the basis of the time of application of the flame, the afterburning time, the drip-off, the flame propagation and the flame temperature as well as the production of gas, scores are given of 1 (very good) to 5 (poor). Plastic specimens measuring 1.6 × 20 × 240 mm are suspended vertically from a suitable hanger in a protective box that is open at the top and one side, and a flame is applied to the bottom end from a non-incandescent, horizontal Bunsen burner flame from a distance of 10 cm. The behavior of the specimen is observed, and scores of 1 to 5 are assigned on the basis of the flame application time, afterburning time, drip-off, and other criteria. The scores given hereinbelow are defined as possible:

1. The flame on the specimen goes out immediately upon removal of the torch flame, after at least 10 seconds of the application of the latter; drips, if any, do not burn.
2. The flame goes out a few seconds after removal of the torch flame; flames on drips go out as they fall.
3. After the torch flame is removed the specimen continues to burn but stops quickly thereafter; drips continue to burn briefly.
4. Specimen continues to burn after removal of the torch flame and flame is extinguished by the dripping away of the burning end; drips continue to burn longer.
5. Specimen burns up completely after removal of the torch flame; drips likewise.

The evaluation scores given below are averages of ten tests.

In all cases, Test UL 94, developed by Underwriters' Laboratories, U.S.A., was performed to confirm the results thus obtained. In this test, specimens 5 inches long, ½ inch wide and ⅛ to 1/16 inch thick were used. The vertically suspended specimens were subjected for 10 seconds to a defined Bunsen burner flame applied to the bottom end. Five specimens were tested in each case. The flame is then applied a second time to the specimen which have been stored for 48 hours at 23° C and 50% atmospheric humidity, and is repeated on specimens which have been stored for 168 hours at 70° C. The ratings SE O, SE I and SE II are determined as follows:

SE O:
No afterburning for more than 10 seconds; Average afterburning time not more than 5 sec.; Afterglow not longer than 30 sec.;
Drips, if any, do not ignite tinder into which they fall.
SE I:
No afterburning for more than 30 seconds; Average afterburning time not more than 25 sec.; Afterglow not longer than 60 sec.;
Drips, if any, do not ignite tinder into which they fall.
SE II:
Whenever drips, under the above conditions, ignite tinder.
Failed:
Afterburning exceeds 30 seconds in any case, or averages more than 25 seconds.

The flame-resistant plastics prepared by the method of the invention can be used with particular success in those applications in which the plastic article is exposed to repeated heating—for example as part of a machine or apparatus, as an architectural member, such as a window molding, roofing material or sliding material, or as a part of marine superstructures.

SUMMARY

Thus the invention provides a process for the preparation of tris-(halophenoxy)-1,3,5-triazine of formula I

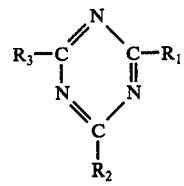

wherein $R_1$, $R_2$, and $R_3$ is each a phenoxy substituent having a 0-2 alkyl groups, and 0-2 halo groups, and has 1-5 halogen atoms which comprises contacting cyanuric acid chloride with alkali phenolate of the formulae $R_1Me$, $R_2Me$, and $R_3Me$, wherein Me is alkali metal, and wherein said formulae can be identical or different, in the presence of alkylene diol monoalkyl ether e.g. methyl or ethyl cellosolve. The ethers are good solvents for the phenolates. The products are used as flameproofing agents for plastics.

EXAMPLES

Examples 1 to 8 will serve to further explain the preparation of the products of the invention. Examples 9 to 13 contain formulas for the preparation of flame-resistant plastics and proof of great effectiveness, although the enumeration is not exhaustive.

EXAMPLE 1

Preparation of tris-(2,3,4,5,6-pentachlorophenoxy)-sym.-triazine.

In a three-necked round flask, equipped with stirrer and reflux condenser, 90.7 g (0.3 mole plus 5% excess) of technical pentachlorophenol sodium is dissolved at about 50° C in 900 ml of ethylene glycol monomethyl ether and this solution is heated to about 60° C. At this temperature, 18.4 g (0.1 mole) of technical cyanuric acid chloride is poured into the phenolate solution with good stirring, over a period of 2 to 3 minutes, the temperature of the reaction mixture rising to about 70° to 73° C due to the reaction heat. When all of the cyanuric chloride has been added, the mixture is refluxed for an additional 30 minutes with stirring, a temperature of approximately 110° C establishing itself in the reaction mixture. After cooling, the triazine derivative which has already precipitated at the boiling temperature is suction filtered, washed first with some methanol, and then with water to remove the sodium chloride that has formed, until there is no more chloride in the filtrate, and the tris-(pentachlorophenoxy)-triazine is dried. 85 g is obtained, corresponding to 97% of the theoretical amount, melting point 265°-268° C. When twice recrystallized from trichloroethylene an analytically pure preparation is obtained having a melting point of 277°-278° C.

Elemental analysis: $C_{21}Cl_{15}N_3O_3$ (MG = 874).
Calculated: 28.85% C; 60.85% Cl; 4.81% N; 5.49% O;
Found: 29.18% C; 60.45% Cl; 4.69% N; 5.63% O.

From a signal series of 832-846 in the mass spectrum it becomes apparent that the molecular weight of the substance obtained must be greater than 832, thus confirming the presence of the tris compound.

EXAMPLE 2

Tris-(2,3,4,6-tetrachlorophenoxy)-s-triazine

In the same apparatus as in Example 1, 37.0 g of potassium hydroxide (= 0.66 mole) is dissolved in 900 ml of ethylene glycol monomethyl ether at 75° C, and then, at this temperature, 152.5 g (0.66 mole) of 2,3,4,6-tetrachlorophenol is poured in, and immediately thereafter 40.5 g (0.22 mole) of cyanuric acid chloride is stirred into the phenolate solution over a period of 1 to 2 minutes, whereupon the temperature of the reaction mixture rises to 84° C. The reaction is allowed to run to completion for 30 minutes at the refluxing temperature, and the product is separated as described in Example 1. Yield: 134 g (79%), melting point 165°–168° C. When recrystallized from benzine (B.P. 80°–100°), melting point 167°–169° C.

Elemental Analysis: $C_{21}H_3Cl_{12}N_3O_3$ (MG = 770.69). Calculated: 32.70% C; 0.39% H; 55.22% Cl; 5.45% N; 6.23% O; Found: 32.98% C; 0.42% H; 55.47% Cl; 5.33% N; 6.09% O.

EXAMPLE 3

Tris-(2,4,6-trichlorophenoxy)-sym.-triazine

By the procedure of Example 1, 12 g of sodium hydroxide (0.3 mole) is dissolved at 70° C in 600 ml of ethylene glycol monoethyl ether, and by the addition of 59.25 g (0.3 mole) of 2,4,6-trichlorophenol a phenolate solution is prepared into which 18.4 g (0.1 mole) of cyanuric acid chloride is added at 70° C over a period of one minute, whereupon the temperature rises to about 77° C. This is followed by one-half hour of refluxing, and then the product is separated as in Example 1. 58.5 g (87.5%) of triazine derivative is obtained, melting point 181°–183° C. When recrystallized from benzine of M.P. 80°–100° C, the melting point was found to be 183° C.

Elemental Analysis: $C_{21}H_6Cl_9N_3O_3$ (MG = 667.33) Calc.: 37.80% C; 0.90% H; 48.70% Cl; 6.30% N; 7.19% O; Found: 37.76% C; 0.77% H; 47.66% Cl; 6.19% N; 7.34% O.

The following bands of the infrared spectrum serve to indicate the structure:

CH (aromatic): 3080 cm$^{-1}$
C=N; C=C (aromatic); 1560, 1590 cm$^{-1}$
C—O (aromatic ether): 1235 cm$^{-1}$
C—Cl (aromatic): 1050–1130 cm$^{-1}$
CH (tetra-subst. aromatic): 800–850 cm$^{-1}$ The NMR spectrum shows a singulet signal for the protons of the 2,4,6-trichlorophenoxy radical. Comparison of this integral relatively to an internal standard (fumaric acid diethyl ester) of defined structure makes it possible, upon the weighing of the two components, to say that the product is tris-(2,4,6-trichlorophenoxy)-1,3,5-triazine.

EXAMPLE 4

Tris-(2,4-dichlorophenoxy)-sym.-triazine 60 g (1.5 moles) of sodium hydroxide are dissolved at 75° C in 1.8 liters of ethylene glycol monomethyl ether and this solution is made into a phenolate solution by the addition of 244.5 g (1.5 moles) of 2,4-dichlorophenol. Then, at 75° C, over a period of about 3 minutes, 92 g (0.5 mol) of cyanuric acid chloride is stirred in, resulting in a temperature increase to 83° C. To complete the reaction the mixture is then refluxed for 30 minutes with stirring. After the reaction mixture has cooled it is stirred into 6 liters of cold water; the precipitated triazine derivative is suction filtered, washed with water and dried. 260 g (92%) tris-(2,4-dichlorophenoxy)-triazine, M.P. 115°–117° C is obtained. When recrystallized from ethanol in a 1 : 40 ratio, the substance melts at 121°–123° C and gives the following analysis:

Elemental analysis: $C_{21}H_9Cl_6N_3O_3$ (MG = 564.04). Calc. 44.70% C; 1.60% H; 33.70% Cl; 7.45% N; 8.53% O; Found: 44.59% C; 1.54% H; 33.81% Cl; 7.52% N; 8.65% O.

EXAMPLE 5

Tris-(2,4-dichloro-6-methyl-phenoxy)-s-triazine.

By the same procedure as in Example 1, 60 g of sodium hydroxide is dissolved at 70° C in 1.8 liters of ethylene glycol monomethyl ether and, by the addition of 265.6 g (1.5 moles) of 2,4-dichloro-6-methylphenol, a phenolate solution is prepared into which 92 g (0.5 mole) of cyanuric acid chloride is stirred at 70° over a period of 3 minutes, causing the temperature of the reaction mixture to rise to 81° C. After half an hour of refluxing, the product is separated as in Example 1.

248 g (82%) of triazine derivative of M.P. 180°–182° C is obtained.

By greatly concentrating the mother liquor and/or by pouring it into water, the yield can easily be increased to over 90%.

Recrystallization from ethylene glycol monomethyl ether in a ratio of about 1 : 12 delivers the pure substance of M.P. 182°–184° C.

Elemental analysis: $C_{24}H_{15}Cl_6N_3O_3$ (MG = 606.13). Calc.: 47.60% C; 2.48% H; 35.15% Cl; 6.93% N; 7.83% O; Found: 47.48% C; 2.39% H; 35.33% Cl; 6.98% N; 7.92% O.

EXAMPLE 6

Tris-(2,3,4,5,6-pentabromophenoxy)-s-triazine.

In a 10-liter three-necked flask, which was equipped as in Example 1, 210 g (5.25 moles) of sodium hydroxide were dissolved in 6.3 liters of ethylene glycol monoethyl ether (ethyl cellosolve) at 70° C. This solution was made into a phenolate solution by stirring into it 2,566 grams (5.25 moles) of pentabromophenol at 70° C, and 322 grams (1.75 moles) of cyanuric acid chloride and gradually added to the solution, with stirring, whereupon the temperature of the mixture rises to 85°–86° C. Then the reaction is allowed to complete itself for 30 minutes at 115° C, and the product is separated in the manner described in Example 1. 2,525 g (86%) of triazine derivative is obtained, having a melting point of 334°–337° C, which, after recrystallization from nitrobenzene (ratio 1 : 12), melts at 358°–361° C, and shows the following analysis:

Elemental analysis: $C_{21}Br_{15}N_3O_3$ (MG = 1,540.9). Calculated: 16.38% C; 77.78% Br; 2.73% N; 3.11% O; Found: 16.54% C; 77.46% Br; 2.81% N; 3.13% O.

EXAMPLE 7

Tris-(2,4,6-tribromophenoxy)-sym.-triazine a. The following quantitites of substances were made to react under the same conditions as Example 1 and the products were processed as described therein:

7,200 ml of methyl cellosolve
144 g (3.6 moles) sodium hydroxide
1,190 g (3.6 moles) 2,4,6-tribromophenol, and
221 g (1.2 moles) cyanuric acid chloride.

Yield of tris-(tribromophenoxy)-triazine: 1,110 g (86.5%), M.P. 214°–216° C. Recrystallization from boiling methyl cellosive in a ratio of about 1 : 10 yields a crystal product of M.P. 229°–231° C.

Elemental analysis: $C_{21}H_6Br_9N_3O$ (MG = 1067.4). Calc.: 23.79% C; 0.46% H; 67.52% Br; 3.90% N; 4.38% O; Found: 23.64% C; 0.51% H; 67.40% Br; 3.92% N; 4.52% O.

The NMR spectrum shows a singulet signal ( d = 7.63 ppm) in the range of the aromatic protons. Comparative measurements against a defined standard (diethyl fumarate) show 6 aromatic protons for the triazine derivative. This proves that the triazine ring is substituted by three 2,4,6-tribromophenoxy radicals.

b. In a manner similar to that described under a), but with the use of 7,500 ml of ethylene glycol monobutyl ether in one case and propylene glycol monomethyl ether in the other as solvents, the same results were obtained.

EXAMPLE 8

⅔ pentachlorophenoxy-substituted and ⅓ pentabromophenoxy-substituted s-triazine.

By the method and procedure of Example 1, the following substances and quantities were reacted:
1.8 liter ethylene glycol monomethyl ether,
60 grams sodium hydroxide
244.3 grams pentabromophenol (0.5 mole),
266.4 grams pentachlorophenol (1.0 mole) and
92 grams cyanuric acid chloride (0.5 mole).

After the same product processing as in Example 1, 335 grams (61%) of triazine derivative are obtained having a melting point of 254°-270° C. This triazine derivative is entirely soluble in hot trichloroethylene and consequently is contains little or no tris-(pentabromophenoxy)-triazine. It is therefore concluded that each molecule contains both pentachlorophenoxy and pentabromophenoxy substituents.

The yield can be increased to more than 90% by concentration and/or pouring into water.

EXAMPLE 9

86 parts of polybutylene terephthalate, $\eta_{red}$ 1.50
10 parts of tris-pentabromophenoxy-sym.-triazine and
4 parts of $Sb_2O_3$ were mixed in a double-screw extruder with mixing section and kneading block at 240°-265° C, extruded in strand form and granulated. The granules were molded on a small injection molding machine to form test specimens measuring 1.6 × 20 × 240 mm.

The specimen thus prepared was given a score of "1" in the test, which is the score for the best flame resistance.

A confirmatory UL 94 test given similar results: the specimen is self-extinguishing, drips do not ignite cotton. It is accordingly classified "SE O."

EXAMPLE 10

81 parts low-pressure polyethylene,
15 parts tris-tribromophenoxy-sym.-triazine,
4 parts $Sb_2O_3$.

The test specimens are produced as in Example 1. In the fire test the mixture is given a score of 2, for good fire protection. On the basis of UL 94, the specimen is classified "SE II."

Similar results are obtained with high-pressure polyethylene.

EXAMPLE 11

85 parts of polystyrene,
12 parts of tris-pentabromophenoxy-sym.-triazine,
3 parts $Sb_2O_3$.

The components are mixed together at 135° C in a correspondingly heated roller mixer, then granulated and injection molded to form test specimens.

In the fire test the plastic proves to be incombustible and receives a score of "1".

EXAMPLE 12

80 parts polyethyleneterephthalate
16 parts tris-pentachlorophenoxy-sym.-triazine
4 parts $Sb_2O_3$
are processed as in Example 1.

The fire test gives a score of "2", and according to the UL 94 test the specimen is self-extinguishing, with a score of "SE II".

EXAMPLE 13

80 parts acrylonitrile-butadiene-styrene resin,
16 parts tris-pentabromophenoxy-sym.-triazine, and
4 parts $Sb_2O_3$.

The same procedure is followed as in Example 3. The fire test gives a score of "1", and the UL 94 test give the material a score of "SE O."

We claim:

1. In the process for the preparation of tris-(halophenoxy)-1,3,5-triazine of formula I

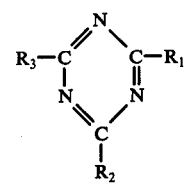

wherein
$R_1$, $R_2$, and $R_3$ is each a phenoxy substituent having 0-2 alkyl groups, and 0-2 halo alkyl groups, and has 1-5 halogen atoms which comprises contacting cyanuric acid chloride with alkali phenolate of the formulae $R_1Me$, $R_2Me$, and $R_3Me$, wherein Me is alkali metal, and wherein said formulae can be identical or different, the improvement which comprises conducting said contacting in the presence of alkylene diol monoalkyl ether as solvent at a temperature of 60-180° C and for a time sufficient for production of said trizine.

2. Process of claim 1, wherein
$R_1$, $R_2$, and $R_3$ is each a phenoxy substituent having 0-2 alkyl groups of 1-4 carbon atoms and has 1-5 halogen atoms attached directly to the nucleus.

3. Process of claim 2, wherein
$R_1$, $R_2$, and $R_3$ has 2-5 halogen atoms attached directly to the nucleus.

4. Process of claim 1, wherein the pheonolate is produced in the solvent by contacting therein alkali hydroxide and phenol of the formulae $R_1OH$, $R_2OH$, and $R_3OH$, wherein said phenol formulae can be alike or different.

5. Process of claim 1, wherein the molar ratio of the alkali phenolate to cyanuric acid is 3:1.

6. Process of claim 1, wherein the alkylene group of said solvent has 2 to 4 carbon atoms, and wherein the alkyl group has 1 to 4 carbon atoms.

7. Process of claim 3, wherein the phenolate is sodium or potassium phenolate, and the solvent is ethylene glycol monomethyl ether or ethylene glycol monoethyl ether.

8. Process of claim 1, characterized in that sodium or potassium phenolate is used as the alkali phenolate.

9. Process of claim 1, characterized in that ethylene glycol monomethyl ether or ethylene glycol monoethyl ether is used as solvent.

10. Process of claim 1, characterized in that the contacting is performed at atmospheric pressure at temperature between 85° C and 150° C.

11. Process of claim 3, wherein the solvent has a boiling point above 100° C.

* * * * *

UNITED STATES PATENT OFFICE
CERTIFICATE OF CORRECTION

PATENT NO. : 4,039,538

DATED : August 2, 1977

INVENTOR(S) : Dr. Herbert Klinkenberg, Dr. Egon Petersen and, Dr. Werner Schmidt It is certified that error appears in the above-identified patent and that said Letters Patent are hereby corrected as shown below:

Column 4, line 25, change "boro" to --boron--.

Column 5, line 31, after "specimen" insert --at the burnt end. The test is performed on specimens--.

Column 9, line 18, after "and" insert --1/3--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks